(12) United States Patent
Lelieveld et al.

(10) Patent No.: US 11,739,008 B2
(45) Date of Patent: Aug. 29, 2023

(54) HANDHELD ELECTRONIC SOAP DEVICE

(71) Applicant: KONINKLIJKE PHILIPS N.V., Eindhoven (NL)

(72) Inventors: Mark Johannes Lelieveld, Shatin (HK); Pieter Jelle Buijs, Haren (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 242 days.

(21) Appl. No.: 17/293,513

(22) PCT Filed: Dec. 12, 2019

(86) PCT No.: PCT/EP2019/084775
§ 371 (c)(1),
(2) Date: May 13, 2021

(87) PCT Pub. No.: WO2020/120645
PCT Pub. Date: Jun. 18, 2020

(65) Prior Publication Data
US 2022/0119282 A1 Apr. 21, 2022

(30) Foreign Application Priority Data
Dec. 12, 2018 (EP) .................................... 18212037

(51) Int. Cl.
*A47K 5/00* (2006.01)
*A47K 7/04* (2006.01)
*C02F 1/461* (2023.01)

(52) U.S. Cl.
CPC ............ *C02F 1/4618* (2013.01); *A47K 7/043* (2013.01); *C02F 2001/4619* (2013.01);
(Continued)

(58) Field of Classification Search
CPC .......... C02F 1/4618; C02F 2001/46185; C02F 2001/4619; C02F 2201/005;
(Continued)

(56) References Cited

U.S. PATENT DOCUMENTS 9,889,065 B2    2/2018  Sedic
2009/0159436 A1 6/2009  Kasuya
(Continued)

FOREIGN PATENT DOCUMENTS

CN    202089787    12/2011
CN    202559488    11/2012
(Continued)

OTHER PUBLICATIONS

International Search Report and Written Opinion dated Feb. 13, 2020 for International Application No. PCT/EP2019/084775 Filed Dec. 12, 2019.

*Primary Examiner* — Zulmariam Mendez

(57) ABSTRACT

The present invention relates to a handheld electronic soap device (1), where pH neutral water is poured in the device through a water inlet (2) into an electrolytic cell (11). The pH neutral water is split into acidic ionized and alkaline ionized water by an electrolysis. The alkaline and acidic water can be used for cleaning and rinsing of skin or hair. More particularly, the alkaline water enables to clean skin or hair, whereas the acid water is important to maintain the acid environment on hairs and skin. According to the present invention a user can select between acidic or alkaline water to be poured out of the device through a water outlet (4).

15 Claims, 6 Drawing Sheets

(52) U.S. Cl.
 CPC ........ *C02F 2001/46185* (2013.01); *C02F 2201/005* (2013.01); *C02F 2201/009* (2013.01); *C02F 2201/4618* (2013.01); *C02F 2209/06* (2013.01); *C02F 2307/06* (2013.01)

(58) Field of Classification Search
 CPC ........ C02F 2201/009; C02F 2201/4618; C02F 2209/06; C02F 2307/06; A47D 7/043
 See application file for complete search history.

(56) References Cited

U.S. PATENT DOCUMENTS

| | | |
|---|---|---|
| 2013/0056350 A1 | 3/2013 | Sin |
| 2013/0180859 A1 | 7/2013 | He |

FOREIGN PATENT DOCUMENTS

| | | |
|---|---|---|
| CN | 104787856 A | 7/2015 |
| CN | 206391172 U | 8/2017 |
| CN | 107475991 | 12/2017 |
| JP | H08191710 | 7/1996 |
| JP | 2000139546 | 5/2000 |
| WO | 2008138357 | 11/2008 |
| WO | 2008138360 | 11/2008 |

HANDHELD ELECTRONIC SOAP DEVICE

CROSS REFERENCE TO RELATED APPLICATIONS

The application is the U.S. National Phase application under 35 U.S.C. § 317 of International Application No. PCT/EP2019/084775 filed Dec. 12, 2019, which claims the benefit of European Patent Application Number 1821037.8 filed Dec. 12, 2018. These applications are hereby incorporated by reference herein.

FIELD OF THE INVENTION

The present invention relates to a handheld electronic soap device that may be used to clean skin or hair.

BACKGROUND OF THE INVENTION

Humans typically wash their body with soap and their hair with shampoo. There exist many types of chemical soaps, whereby most of the products have in common that they feature an alkaline pH. Alkaline soaps consist of hydrophilic parts that bind with water and hydrophobic parts that bind with grease and thus enable to remove oils from hair or skin. A disadvantage of the alkaline pH is that the use of soaps raises the pH of skin, at least for a certain time period after washing skin or hair with alkaline products. The pH of skin as well as the pH of healthy hair is typically acidic. For good health it has to maintain the acidic character. Excessive alkalinity dries out hair and destroys the acid mantle of the skin. This acid mantle is a protection for the skin as the pH strongly affects the resident bacteria on the skin. Hence, acid water can help to maintain the important acid mantle of the skin and is also very essential for healthy and shiny hair and the underlying scalp, especially with regard to dandruff.

Apart from the acidic and alkaline aspect, many soaps contain chemical substances, which might be problematic with regard to environmental loading. It would be of great interest to replace the chemical variant with an environmentally-friendly solution that further provides a possibility to maintain the acid environment on hair and skin.

US 2009/159436 A1 discloses an electrolyzed water generating and spraying device that allows to spray electrolyzed water immediately after being generated onto human skin or the like. However, there remains a need to have a handheld device, which allows direct local treatment on the skin and hair and can be used under the shower.

SUMMARY OF THE INVENTION

It is an object of the present invention to provide a handheld electronic soap device configured to replace the use of conventional soaps.

In a first aspect of the present invention a handheld electronic soap device is presented comprising:
- a water inlet configured to pour in water;
- an electrolytic cell connected to the water inlet and configured to generate alkaline ionized water and acidic ionized water from the poured-in water;
- a selector configured to select discharge of generated alkaline ionized water and/or acidic ionized water; and
- a water outlet configured to discharge the selected ionized water.

Preferred embodiments of the invention are defined in the dependent claims.

The present invention is based on the idea to have a device that allows cleaning of skin and hair under the shower or tap without using chemical/additives based cleaning agents. The water poured in the device through the water inlet is collected in an electrolysis cell, where an electrolysis is configured to split the inlet water into acidic ionized water and alkaline ionized water. Tap water is typically neutral (pH=7) or slightly alkaline with a pH value slightly larger than 7. The electrolysis transforms this inlet water into two different water portions, one with a pH value smaller than 7 and the other one with a pH larger than 7.

The alkaline ionized water enables to remove oils from the surface of skin and hair and replaces the role of the alkaline soap that is typically used by humans to clean hair or skin. The acidic ionized water is essential to maintain the acidic environment on skin and hair, which is typically destroyed for some time after cleaning hair or skin with alkaline products. Furthermore, the cleaning and rinsing with such kind of device might further prevent or resolve skin issues as many skin problems, such as acne, all have a common factor: the skin pH.

Thus, the device is configured to select between alkaline ionized water and acidic ionized water. This is achieved according to the present invention by use of a selector in the electrolytic cell configured to select discharge of the generated ionized water. The selected ionized water is then discharged through the water outlet and used for cleaning or rinsing of hair and skin. The resulting pH value on skin or hair is a mixture of the pH values of the outlet volume flow and environmental water flow if the device is used, e.g., under the shower. Thinking further into future, such devices might be connected with IoT (Internet of Things) to adjust the level of acidity individually based on skin measurements. Individual pH measurements of skin or hair might be stored in a remote entity, such as a smartphone or a cloud, to individually adjust the pH value of the ionized water used for rinsing and cleaning.

According to an embodiment, the handheld electronic soap device comprises a user interface connected to the selector allowing a user to switch between alkaline ionized water and acidic ionized water to be discharged through the water outlet. Preferably, the user interface comprises a button, a switch, a knob or touchpad. This design allows a user to select discharge of either alkaline ionized water or acidic ionized water.

Preferably, the handheld electronic soap device is configured to generate water for discharge having a pH value in a range from pH=3 to pH=11. As mentioned above, the final pH on hair or skin is a mixture of the discharged ionized water and the environmental water flow if the device is used under the shower or tap. Thus, a variety of pH values between pH=3 and pH=11 are possible on hair or skin of the user.

Every human skin or hair is individually different and it is of particular interest to discharge either alkaline ionized water or acidic ionized water with a user-defined pH value to provide an improved cleaning and care of hair and skin. The user interface, e.g., in the form of a touchpad may be configured to store individual cleaning procedures on a memory, where the proper time periods and pH values of the discharged alkaline ionized water and acidic ionized water are adjusted depending on the individual requirements of the user.

According to another embodiment, the handheld electronic soap device further comprises a sensor configured to measure the pH value of the discharged water. Preferably, the pH sensor is arranged close to the water outlet to reliably measure the pH value of the discharged water. Based on the measured pH value of the discharged water, the device may automatically adjust the set pH value of the discharged water. Thus, the resulting feedback mechanism enables to adjust the pH value of the discharged water precisely.

According to another embodiment, the handheld electronic device further comprises a first chamber configured to store the acidic ionized water and a second chamber configured to store the alkaline ionized water.

Preferably, said first chamber and second chamber are connected to the selector.

According to another embodiment, the selector of the handheld electronic soap device comprises a valve configured to mix the alkaline ionized water and acidic ionized water in a predetermined or user-defined ratio. The user-defined ratio is controllable via the user interface connected to the selector.

According to another embodiment, the handheld electronic soap device further comprises a tank configured to store ionized water generated in the electrolytic cell, a first outlet portion configured to connect the electrolytic cell and the water outlet, and a second outlet portion configured to connect the electrolytic cell and the tank. Thus, the selected ionized water to be discharged through the water outlet is flowing from the electrolytic cell through the first outlet portion to the water outlet, where it is discharged for the cleaning and rinsing. The tank acts as a reservoir to collect residual ionized water, which has already passed the electrolytic cell before.

Preferably, the residual water collected in the tank is the ionized water generated by the electrolytic cell but not discharged. Hence, if the user selects via the user interface that, e.g., alkaline ionized water to be discharged through the first outlet portion and the water outlet, the residual acidic ionized water flows through the second outlet portion into the tank where it gets stored until the user decides to discharge acidic ionized water and switches, via the user interface, to acidic ionized water to be discharged.

According to another embodiment, the water inlet is connected to an inlet channel, which has a swan neck or a serpentine, spiral or sinuous shape to allow water to pour into the electrolytic cell. The specific shape of the inlet channel is configured to allow water to pour into the electrolytic cell, but not easily escape. The inlet channel might further comprise a valve to retain the water level.

According to another embodiment, the handheld electronic soap device comprises a plurality of water outlet portions. This enables to maximize the outlet area and improves the water outlet distribution, especially if the device is in direct contact with hair or skin. Preferably, the handheld electronic soap device further comprises a plurality of scrubbing elements to massage the skin or hair and/or to improve the cleaning effect by rubbing these scrubbing elements over the skin or hair.

According to another embodiment, the handheld electronic soap device has the shape of a soap block. Thus, the device has an ergonomic shape, fits well in the hand and simplifies the cleaning and rinsing process under shower.

According to another embodiment, the handheld electronic soap device further comprises a charge plug connected to a power supply. Preferably, the power supply is a rechargeable battery that is configured to be rechargeable by an external adapter attachable to the charge plug. Instead of using an external adapter attachable to the charge plug, the handheld electronic soap device may further be configured to be rechargeable contactlessly by using, e.g., an external charging pad, where the handheld electronic soap device is placed on during the charging process. Thus, the presented embodiment allows that the device is mobile and a flexible use is guaranteed.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE EMBODIMENTS

Figure 1:
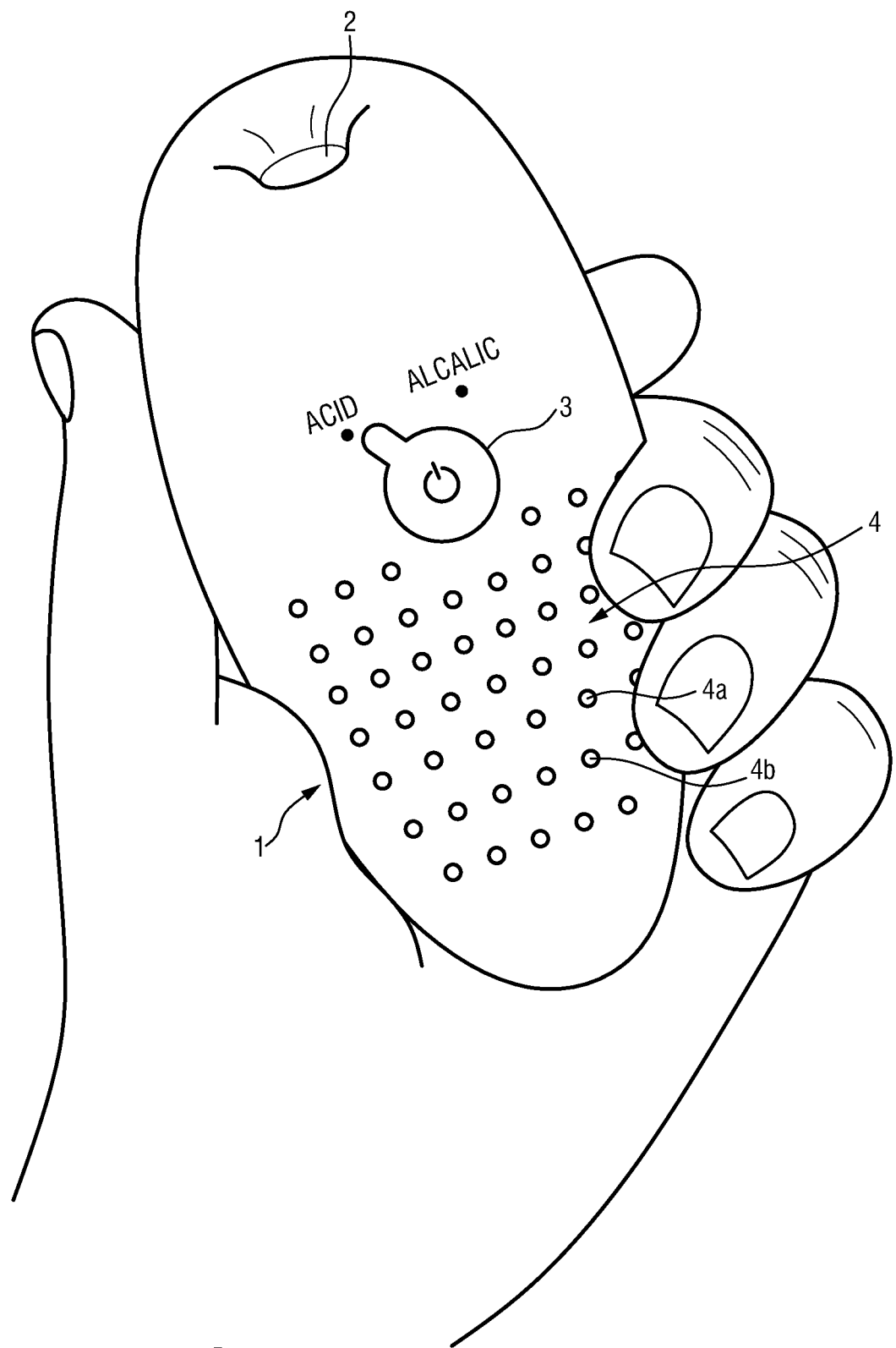
FIG. 1 shows a perspective view of a preferred embodiment of a handheld electronic soap device according to the present invention.

FIG. 1 shows a perspective view of an embodiment of a handheld electronic soap device 1 according to the present invention. The handheld electronic soap device 1 has an ergonomic shape of a soap block and fits well into the hand of a user, underlining the aspect that the device aims at replacing the chemical variant of soaps and shampoos typically used for cleaning hair and skin. The handheld electronic soap device comprises a water inlet 2 placed on an upper side of the handheld electronic soap device 1 assuming that it is accordingly held in the hand of a user as shown in FIG. 1. The handheld electronic soap device 1 can be used under tap or shower and the placement of the water inlet 2 at the upper side allows water to pour into the device simply due to gravitational force.

The handheld electronic soap device 1 further comprises a user interface 3, which is a binary switch in the specific embodiment shown in FIG. 1. The user can switch the handheld electronic soap device 1 on and off and switch between acidic or alkaline ionized water, preferably with a predetermined or user-defined pH value. The ionized water is generated by an electrolysis, which is explained in more detail below. The handheld electronic soap device 1 further comprises a water outlet 4 to discharge ionized water, which is selected by user interface 3. For a better water distribution on hair and skin, the water outlet comprises a plurality of water outlet portions 4a, 4b, . . . .

Figure 2:
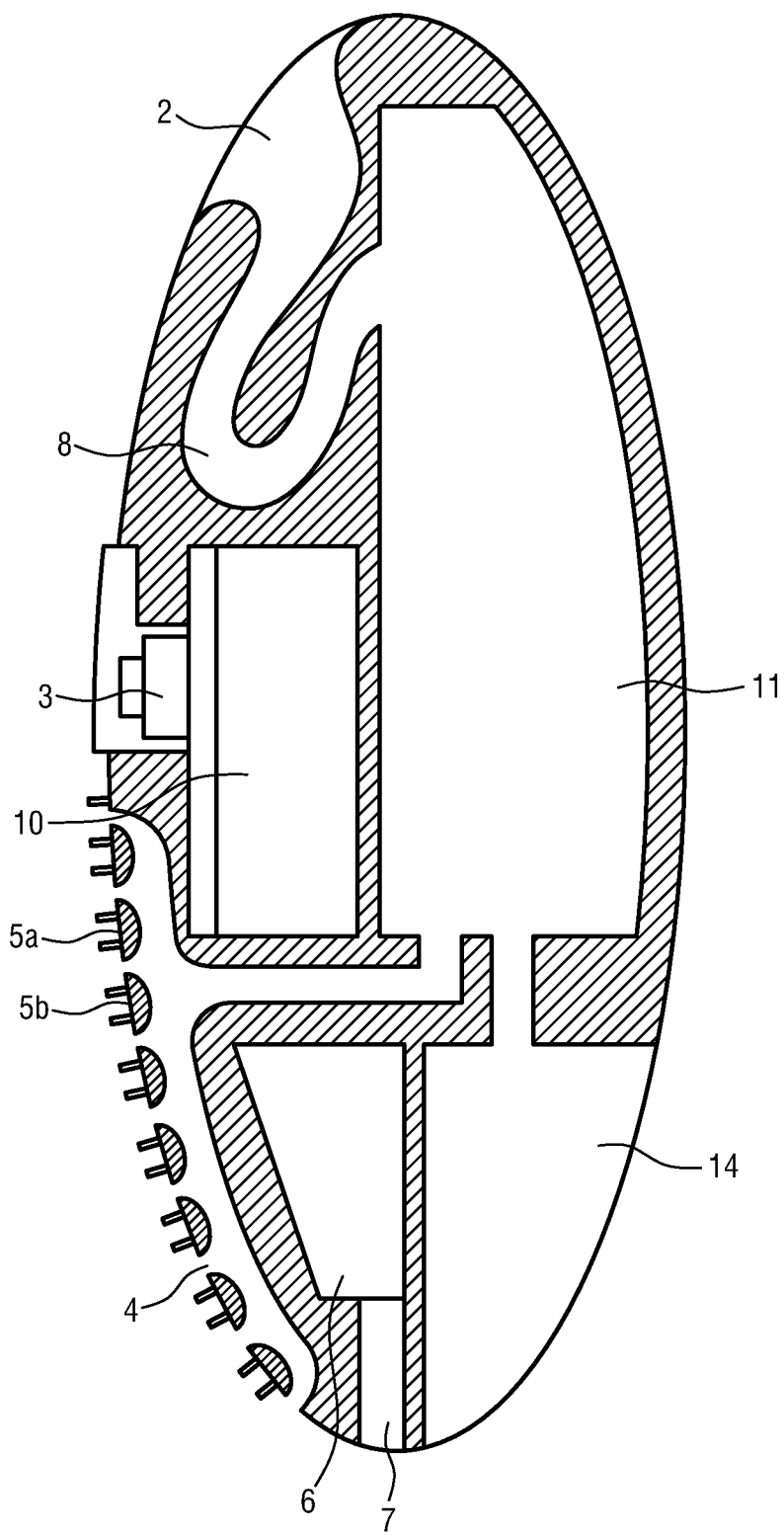
FIG. 2 shows a cross-sectional view of the handheld electronic soap device shown in FIG. 1.
Figure 3:
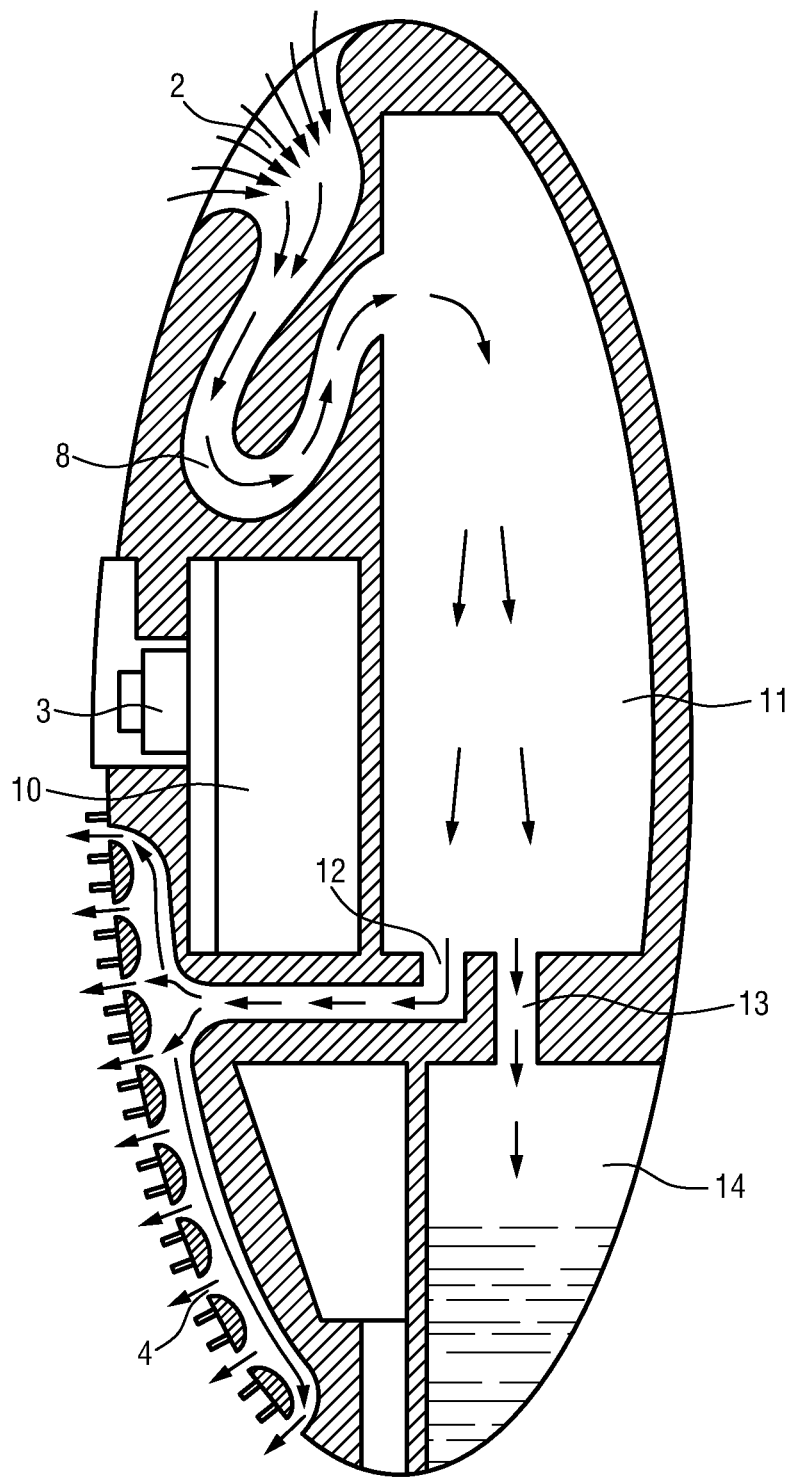
FIG. 3 shows another cross-sectional view of the handheld electronic soap device, where the water flow is additionally shown.

FIGS. 2 and 3 show a cross-sectional view of the handheld electronic soap device 1 as shown in FIG. 1 and allow getting a deeper insight into the inner structure of the handheld electronic soap device 1. Hereby, FIG. 3 further illustrates the water flow in the handheld electronic soap device 1, where inlet water is split into acidic ionized water and alkaline ionized water in the electrolytic cell and discharged through water outlet 4.

The water inlet 2 is connected to a water inlet channel 8, which has a swan neck or serpentine shape in the specific embodiment. This design allows water to pour in easily, but not easily escape. As shown in FIG. 3, the water enters the handheld electronic soap device via water inlet 2 and is discharged through water outlet 4 in the end. After flowing through the water inlet channel 8, the water enters the electrolytic cell 11. The inner structure of the electrolytic cell will be explained later with respect to FIGS. 4 to 6.

The electrolytic cell 11 generates alkaline ionized water and acidic ionized water. Thus, it basically transforms the inlet water into an acidic and alkaline portion with a pH value smaller and larger than 7, respectively.

The power supply 10 is preferably given by a rechargeable battery and supplies the electrolytic cell 11 with the voltage needed to generate acidic ionized water and alkaline ionized water. An electronics module 6 regulates the power supply of the electrolysis and a charge plug 7 might be used, e.g., to recharge the batteries.

The user interface 3, in form of a binary switch in the specific embodiment, allows selecting either alkaline ionized water or acidic ionized water to be discharged through the water outlet 4. The selected ionized water flows through a first outlet portion 12 before leaving the handheld electronic soap device 1 through water outlet 4. The residual water that is generated by the electrolytic cell 11, but not discharged, flows through the second outlet portion 13 into a tank 14, where it is temporarily collected.

The handheld electronic soap device 1 comprises a plurality of scrubbing elements 5a, 5b, . . . , which might be made of silicon and have basically two effects: first, the scrubbing elements 5a, 5b, . . . provide an improved cleaning effect by rubbing the scrubbing elements 5a, 5b, . . . over hair or skin of the user, and secondly, they provide an additional massage effect for the user. The scrubbing elements 5a, 5b, . . . may be configured in the form of a comb or brush to enable hair care. In combination with the discharged acidic ionized water, scalp care, e.g., treatment of dandruff is improved.

The scrubbing elements may for example comprise plastic, rubber, nylon or natural hair, e.g. boar hair.

Figure 4:
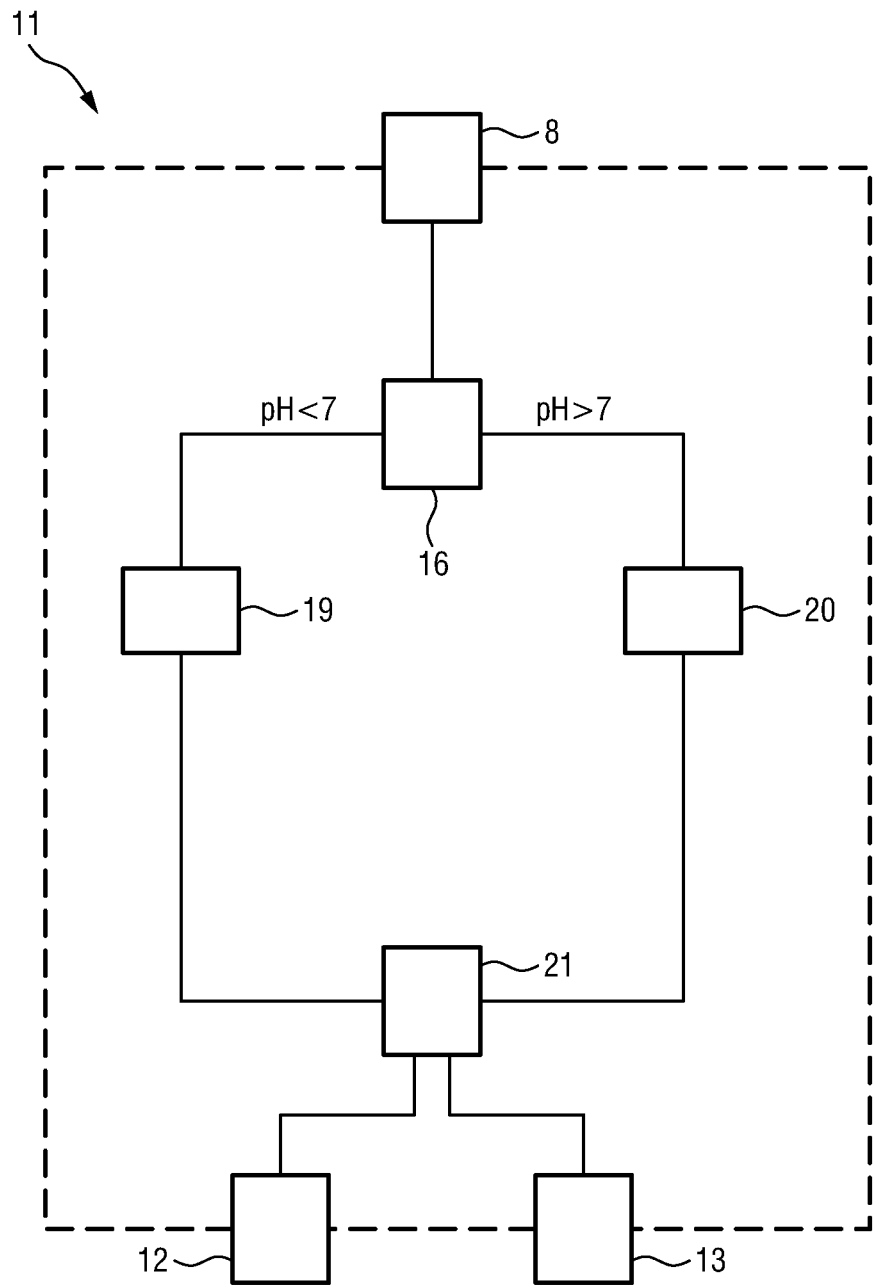
FIG. 4 shows a schematic diagram of some of the elements of the handheld electronic soap device according to an embodiment.

FIG. 4 shows a schematic diagram of some of the elements of the handheld electronic soap device according to an embodiment. As already explained above, the water enters the electrolytic cell 11 via the water inlet channel 8. Subsequently, it is transferred to an electrolysis unit 16, where the water is split into acidic ionized water with a pH<7 and alkaline ionized water with a pH>7. The electrolysis unit 16 comprises a chamber to store water containing two or more electrodes, with a microporous membrane in between each anode-cathode pair. The voltage of the electrodes is provided by the power supply 10 and controlled by the electronics module 6. The anode and cathode attract charge ions, and together with the membrane this separates the water into $OH^-$ (alkaline) and $H^+$ (acidic) fractions. Potentially, the electrolysis unit 16 may further comprise a chamber to store salts that are from time to time added to the water chamber to increase the conductivity of the solution. This increases the efficiency of the electrolysis and allows generating electrolyzed water faster.

The acidic alkaline water gets stored in a first chamber 19, whereas the alkaline ionized water gets stored in a second chamber 20. A selector 21 is configured to mix the alkaline ionized water and acidic ionized water in a predetermined or user-defined ratio. Said selector 21 is connected to the user interface 3 (not shown) and allows the user to switch between alkaline ionized water and acidic ionized water to be discharged. The selected type of water is thus transferred to the first outlet portion 12, whereas the non-selected type of water is transferred to the second outlet portion 13.

Figure 5:
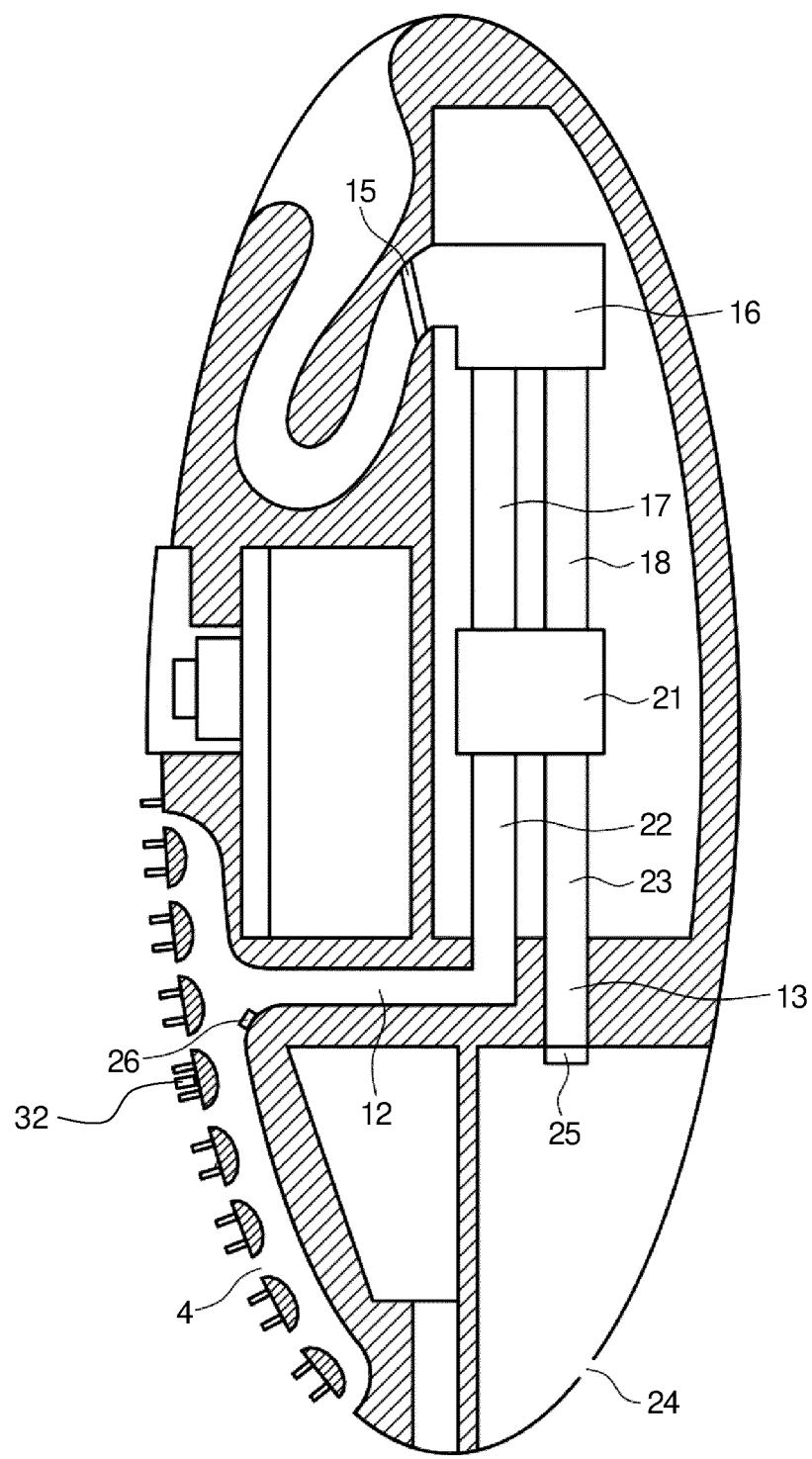
FIG. 5 shows a cross-sectional view of the handheld electronic soap device illustrating the inner structure of the electrolytic cell according to another embodiment.

FIG. 5 shows a cross-sectional view of the handheld electronic soap device 1 illustrating the inner structure of the electrolytic cell according to an embodiment. The water inlet channel 8 is equipped with a valve 15 that is configured to retain the water level in the electrolytic cell 11. Potentially, the water inlet 2 and water inlet channel 8 may further comprise a pump to suck in water effectively. The electrolytic cell 11 comprises an electrolysis unit 16 connected to the water inlet channel 8. Thus, the inlet water flows through valve 15 into the electrolysis unit 16, where an electrolysis splits the inlet water into acidic ionized water and alkaline ionized water. The electrolysis unit 16 is connected to a first channel 17 and a second channel 18, wherein the first channel 17 is configured to guide the acidic ionized water and the second channel 18 is configured to guide the alkaline ionized water. These channels are further connected to the selector 21.

The selector 21 comprises a valve configured to mix alkaline ionized water and acidic ionized water in a predetermined or user-defined ratio. Furthermore, the valve enables to select whether the mixed water enters either the first outlet portion 12, via a third channel 22, connected to the water outlet 4, or the second outlet portion 13, via a fourth channel 23, connected to the tank 14. If the device is properly held in the hand of the user, the first outlet portion 12 and second outlet portion 13 are located below the electrolysis cell 11 and the ionized water flows directly from the electrolysis cell 11 into the first outlet portion 12 as well as into the second outlet portion 13 due to gravitational force. If required, a pump might be installed to effectively pump ionized water into the first outlet portion 12 and second outlet portion 13.

According to another embodiment of the present invention, the handheld electronic soap device 1 stops its function if the tank 14 is completely full. The level of water in the tank is registered by a sensor 25 installed at the top of the tank 14. The user gets a signal, preferably via the user interface 3, to release the tank 14 manually by an outlet valve 24. The handheld electronic soap device 1 may be smart and configured to automatically release water if the tank 14 is full. The amount of water to be released may be adjusted based on the consumer needs. As shown in FIG. 5, the outlet valve 24 is located at the backside of the handheld electronic soap device 1, which enables that the released water does not get in contact with skin of the user.

According to another embodiment of the present invention, the handheld electronic soap device 1 may further comprise a pH sensor 26, preferably arranged on the water outlet 4 to reliably measure the pH value of the discharged water. If the pH value of the discharged water differs from the set pH value, the handheld electronic soap device 1 may readjust the set pH value.

According to yet another embodiment, the handheld electronic soap device comprises a pH sensor 32 at outside surface of the device, preferably near the scrubbing elements, e.g. the brush or comb. This pH sensor is configured to sense the pH of the skin or hair. Depending on the measured pH values the pH of the discharged water may be adjusted. The handheld electronic soap device may be further configured to send the measured pH value with the remote entity, e.g. smartphone or cloud.

Figure 6:
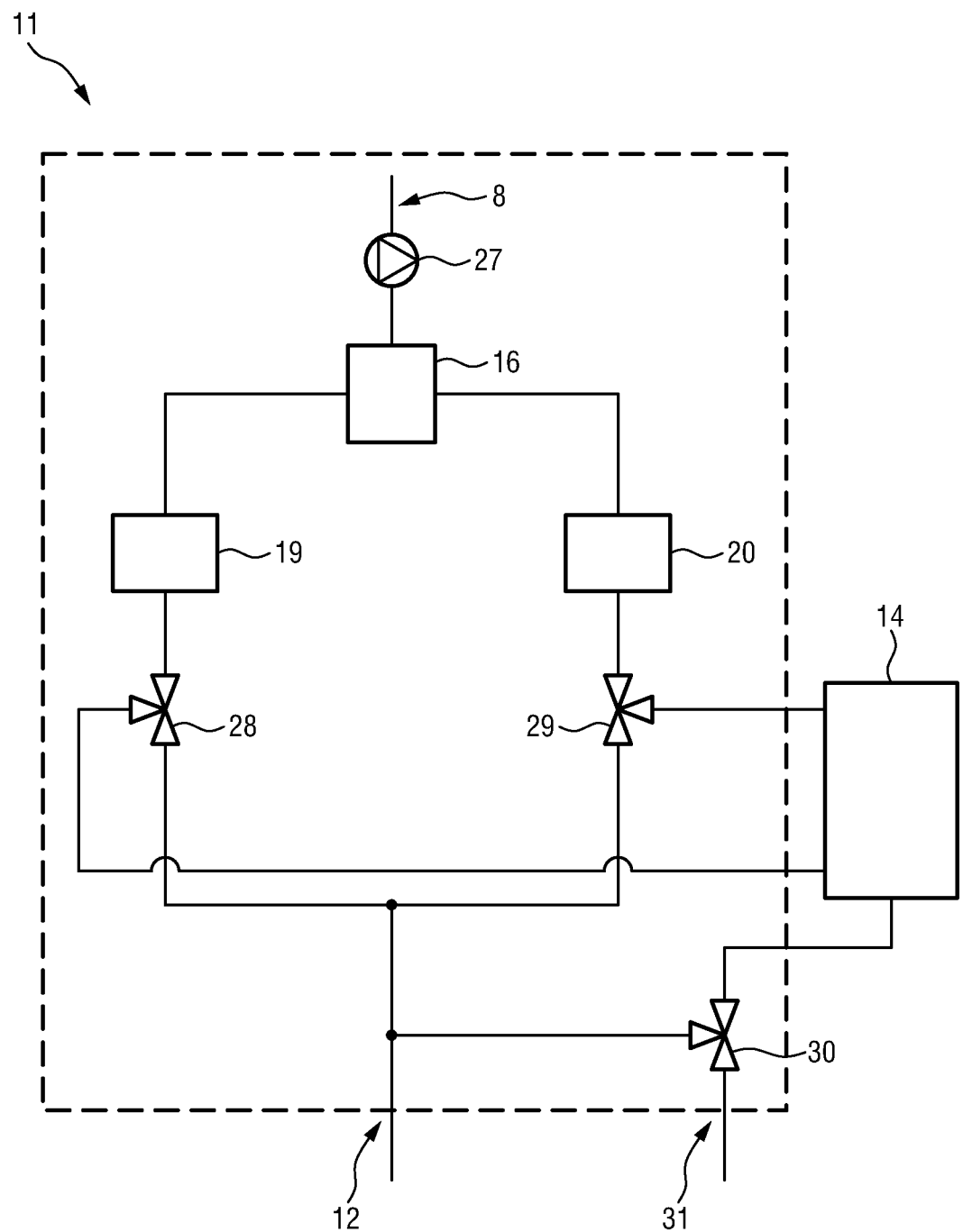
FIG. 6 shows a schematic diagram of some elements of the handheld electronic soap device according to an embodiment.

FIG. 6 shows a schematic diagram of the handheld electronic soap device according to another embodiment with a closer look at the inner structure of the electrolytic cell 11. According to this embodiment, the inlet water flowing through inlet channel 8 is effectively pumped into the electrolysis unit 16 by a pump 27. The electrolysis unit 16 splits the pH neutral water into acidic ionized water and alkaline ionized water as it has already been described for the former embodiments. A first chamber 19 is configured to store the acidic ionized water and a second chamber 20 is configured to store the alkaline ionized water. As already mentioned, it may be of interest that the handheld electronic soap device 1 splits the pH neutral water into electrolyzed water when the handheld electronic soap device is charging, e.g., over night. Thus, the acidic ionized water and alkaline ionized water may be intermediately stored in the chambers 19, 20 and available for a later use of the handheld electronic soap device 1.

Two valves 28, 29, preferably 3-way valves, are connected to the first chamber 19 and the second chamber 20. These valves enable to mix the alkaline ionized water and acidic ionized water that has been previously stored in the chambers 19, 20. One respective outlet channel of the two valves 28, 29 is connected to the first outlet portion 12, which is configured to guide the water to water outlet 4 (not shown), where the electrolyzed water is discharged for hair and skin treatment. Another respective outlet channel of the two valves 28, 29 guides the ionized water into the tank 14 that is configured to collect residual ionized water that is generated by the electrolytic cell but not discharged.

A third valve 30, preferably a 3-way valve, connects the tank 14, the first outlet portion 12 and a release 31. Thus, the stored water of the tank 14 is also configured to be discharged through the first outlet portion 12. This is of particular interest if the user, e.g., first wants to clean the skin with alkaline ionized water and subsequently rinse with acidic ionized water to maintain the acid mantle on skin. The non-selected water, in that case the acidic ionized water, is then stored in the tank 14. If the user switches, via user interface 3 (not shown), to acidic ionized water, the third valve 30 enables to discharge the residual water stored in the tank 14 via the first outlet portion 12. Another connection of the third valve 30 is connected to the release 31, which is preferably installed at the backside of the handheld electronic soap device 1 so that the released water does not get in contact with hair or skin of the user.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A handheld electronic soap device comprising:
   a water inlet configured to pour in water;
   an electrolytic cell connected to the water inlet and configured to generate alkaline ionized water and acidic ionized water from the poured-in water;
   a selector configured to select discharge of generated alkaline ionized water and/or acidic ionized water;
   a water outlet configured to discharge the selected ionized water; and
   a plurality of scrubbing elements arranged on the water outlet.

2. The handheld electronic soap device according to claim 1, wherein the scrubbing elements are configured in the form of a brush or comb.

3. The handheld electronic soap device according to claim 1,
   further comprising a user interface connected to the selector allowing a user to switch between alkaline ionized water and acidic ionized water to be discharged through the water outlet.

4. The handheld electronic soap device according to claim 3,
   wherein the user interface comprises a button, a switch, a knob or touchpad allowing a user to select discharge of either alkaline ionized water or acidic ionized water, in particular with user-defined pH value.

5. The handheld electronic soap device according to claim 1, further comprising a sensor configured to measure the pH value of the discharged water.

6. The handheld electronic soap device according to claim 1, further comprising:
   a first chamber configured to store the acidic ionized water; and
   a second chamber configured to store the alkaline ionized water.

7. The handheld electronic soap device according to claim 1,
   wherein the selector comprises a valve configured to mix alkaline ionized water and acidic ionized water in a predetermined or user-defined ratio.

8. The handheld electronic soap device according to claim 1, further comprising:
   a tank configured to store ionized water generated in the electrolytic cell;
   a first outlet portion configured to connect the electrolytic cell and the water outlet; and
   a second outlet portion configured to connect the electrolytic cell and the tank.

9. The handheld electronic soap device according to claim 7,
   wherein the tank is configured to collect residual ionized water that is generated by the electrolytic cell but not discharged.

10. The handheld electronic soap device according to claim 8, wherein the selector is configured to select discharge of the collected residual water stored in the tank through the water outlet.

11. The handheld electronic soap device according claim 1, wherein the water inlet is connected to an inlet channel, which has a swan neck or a serpentine, spiral or sinuous shape to allow water to pour into the electrolytic cell.

12. The handheld electronic soap device according to claim 1, wherein the water outlet comprises a plurality of water outlet portions.

13. The handheld electronic soap device according to claim 1, further comprising a charge plug connected to a power supply.

14. The handheld electronic soap device according to claim 13, wherein the power supply is a rechargeable battery configured to be rechargeable contactlessly.

15. The handheld electronic soap device according to claim 1, further comprising a pH sensor at outside surface of the device, wherein the pH sensor is configured to sense the pH of the skin or hair.

* * * * *